United States Patent
Okoren et al.

[11] Patent Number: 6,161,395
[45] Date of Patent: Dec. 19, 2000

[54] LIQUID LEVEL SENSOR

[75] Inventors: Ronald W. Okoren, Holmen; Ali S. Ameen, La Crosse; Matthew A. Shepeck, Holmen, all of Wis.

[73] Assignee: American Standard Inc., Piscataway, N.J.

[21] Appl. No.: 09/480,348

[22] Filed: Jan. 10, 2000

Related U.S. Application Data

[62] Division of application No. 08/924,228, Sep. 5, 1997.

[51] Int. Cl.$^7$ ...................................... F25B 31/02
[52] U.S. Cl. .............................. 62/193; 62/129; 340/619; 73/861.41
[58] Field of Search .............................. 62/192, 193, 126, 62/129, 84; 340/609, 612, 618, 619; 73/861.41

[56] References Cited

U.S. PATENT DOCUMENTS

| | | | |
|---|---|---|---|
| 4,105,028 | 8/1978 | Sadlier et al. | 128/214 E |
| 4,138,879 | 2/1979 | Liebermann | 62/129 X |
| 4,210,809 | 7/1980 | Pelavin | 250/343 |
| 4,241,732 | 12/1980 | Berndtsson | 128/204.24 |
| 4,314,484 | 2/1982 | Bowman | 73/861.41 |
| 4,644,755 | 2/1987 | Esslinger et al. | 62/129 X |
| 5,029,448 | 7/1991 | Carey | 62/84 |
| 5,072,595 | 12/1991 | Barbier | 62/129 |
| 5,201,648 | 4/1993 | Lakowske | 418/201 |
| 5,203,685 | 4/1993 | Andersen et al. | 418/1 |
| 5,278,426 | 1/1994 | Barbier | 250/577 |
| 5,341,658 | 8/1994 | Roach et al. | 62/468 |
| 5,347,821 | 9/1994 | Oltman et al. | 62/84 |
| 5,431,025 | 7/1995 | Oltman et al. | 62/84 |
| 5,502,984 | 4/1996 | Boehde et al. | 62/470 |

FOREIGN PATENT DOCUMENTS

0460432A2  5/1991  European Pat. Off. ........ G01F 23/28

*Primary Examiner*—Harry B. Tanner
*Attorney, Agent, or Firm*—William J. Beres; William O'Driscoll; Peter D. Ferguson

[57] ABSTRACT

A sensor system. The system comprises a binary sensor issuing a signal representative of a first or second condition; sampling circuitry, operatively connected to the binary sensor, for monitoring the number of transitions between the first and second conditions during a sampling period; integration circuitry for accumulating the sampled number of transitions over time; and signal generation circuitry for issuing an analog signal representative of the accumulated transitions.

16 Claims, 3 Drawing Sheets

LIQUID LEVEL SENSOR

This application is related to commonly assigned U.S. patent application Ser. No. 08/924,229, now U.S. Pat. No. 5,884,494, entitled "Oil Flow Protection Scheme" as invented by Ronald W. Okoren, Sean A. Smith, Daniel C. Leaver, John R. Moilanen, Paul D. Ulland and Michael D. Carey and filed on even date hereof this patent is a divisional patent of U.S. patent application Ser. No. 08/924,228, entitled "Liquid Level Sensor" and filed Sep. 5, 1997.

BACKGROUND OF THE INVENTION

The present invention is directed to a liquid level sensor for an air conditioning or refrigeration system. The system is an active and robust system which uses a binary sensor to provide an analog output.

The present invention is discussed in terms of lubricating screw compressors for air conditioning systems, but is contemplated to apply to all systems whatever the application. Like many other compressors, screw compressors require oil flow to the compressor so as to lubricate bearings and prevent long term degradation's of the bearings. Additionally, oil flow is needed to seal the rotors in a screw compressor to avoid reduced performance and to cool the rotors to prevent frictional heating.

Oil flow is needed by a compressor to lubricate the bearings and enhance their life. Additionally, in screw and scroll compressors, oil is used to seal the rotors, the absence of such a seal resulting in reduced compressor performance. Also, the lubrication of rotors can prevent frictional heating while cooling the rotors, and can prevent the radial growth and interference of rotors with adjacent compressor components. If the oil circulation system fails and compressor operation is allowed to continue, compressor failure and damage will ultimately result.

U.S. Pat. Nos. 5,431,025 and 5,347,825, both to Oltman et al., are directed to an oil charge loss protection arrangement for a compressor. Essentially both patents disclose comparing the temperature of a liquid in the oil system with the temperature of saturated refrigerant, and generating a signal to shutdown the compressor when the comparison indicates that the differential is off range. These patents are commonly assigned with the present invention and are incorporated herein by reference.

A system is desired which proves that a flow of lubricant is high in oil quantity (i.e., less than 30% refrigerant by weight).

SUMMARY OF THE INVENTION

It is an object, feature and advantage of the present invention to solve the problems in prior systems.

It is an object, feature and advantage of the present invention to provide a binary sensor which provides a binary condition of an inactive system and which provides an analog condition of an active system.

It is an object, feature and advantage of the present invention to use a binary sensor to provide an analog signal.

It is an object, feature and advantage of the present invention to provide an oil protection system which verifies both the quantity and quality of lubricant flow to the compressor.

It is a further object, feature and advantage of the present invention to provide a liquid level sensor in one of the compressor lubricant feed lines to verify oil presence at start-up, and to further use the liquid level sensor to verify oil quality during compressor operation.

It is an object, feature and advantage of the present invention to provide a liquid level sensor, which is normally used only at start-up to verify the presence or absence of liquid at a certain height, in a dynamic environment to determine the quality of a liquid vapor mixture.

It is an object, feature and advantage of the present invention to prove that there is either already lubricant in a compressor at start-up or that there is an immediately available lubricant supply trapped in the lines feeding the compressor prior to compressor start-up.

It is an object, feature and advantage of the present invention to prove lubricant flow in the compressor lubricant feed lines during compressor operation within predetermined time periods.

It is an object, feature and advantage of the present invention to prove that the flow in a lubricant feed line to a compressor is a liquid rather than a vapor.

It is a further object, feature and advantage of the present invention to prove that flow of liquid even in the presence of some normal amount of foam.

It is an object, feature and advantage of the present invention to prove that flow in a lubricant feed line is high in oil quality.

It is a further object, feature and advantage of the present invention to prove that that high quality oil flow is less than 30% refrigerant by weight.

It is an object, feature and advantage of the present invention to provide an oil protection system which allows for inverted start or other normal transient conditions.

It is an object, feature and advantage of the present invention to provide checks where possible in the operation of the components involved in an oil protection system for a compressor and to verify that no flow occurs when there clearly should be no flow.

The present invention provides a sensor system. The sensor system comprises a binary sensor issuing a signal representative of a first or second condition; sampling circuitry, operatively connected to the binary sensor, for monitoring the number of transitions between the first and second conditions during a sampling period; integration circuitry for accumulating the sampled number of transitions over time; and signal generation circuitry for issuing an analog signal representative of the accumulated transitions.

The present invention further provides a method of using a sensor. The method comprises the steps of: sensing a condition; transmitting a binary signal having either a first state or a second state indicative of the sensed condition; determining either a first or a second mode of operation of a prime mover to be in effect; operating the prime mover, in the first mode of operation, responsive to the first or second state of the binary signal; and operating the prime mover, in the second mode of operation, responsive to the rate of transition of the binary signal between the first and second states.

The present invention still further provides a controller and sensor. The controller and sensor comprise a liquid level sensor monitoring the presence or absence of a liquid and providing a binary signal indicative of the presence or absence of the liquid; and a controller operably connected to the sensor and receiving the binary signal. The controller includes components to sample the rate of transitions of the binary signal between a presence indicating signal and an absence indicating signal and to convert the sampled signal to an analog signal. The controller further includes components to integrate the analog signal and to issue control signals responsive to that integrated accumulation.

The present invention yet further provides the circuitry for using a digital sensor as an analog sensor. The circuitry comprises a digital sensor issuing a binary signal having a first or a second state; sampling circuitry for receiving the binary signal, for sampling the state of the binary signal at a moment in time, and converting the sampled signal to a signal representative of a bit count; integrator circuitry to integrate the bit count over time; and circuitry to transmit an analog signal representative of the accumulated integral.

The present invention additionally provides a method of using a digital sensor as an analog sensor. The method comprises the steps of: measuring a binary state with a digital sensor; constantly transmitting a binary signal indicative of either a first or a second binary state; sampling the transmitted signal at a first sampling rate to determine a bit count; integrating the product of the bit count over time; and issuing an analog signal reflected of the integrated bit count accumulation.

DETAILED DESCRIPTION OF THE INVENTION

Figure 1:
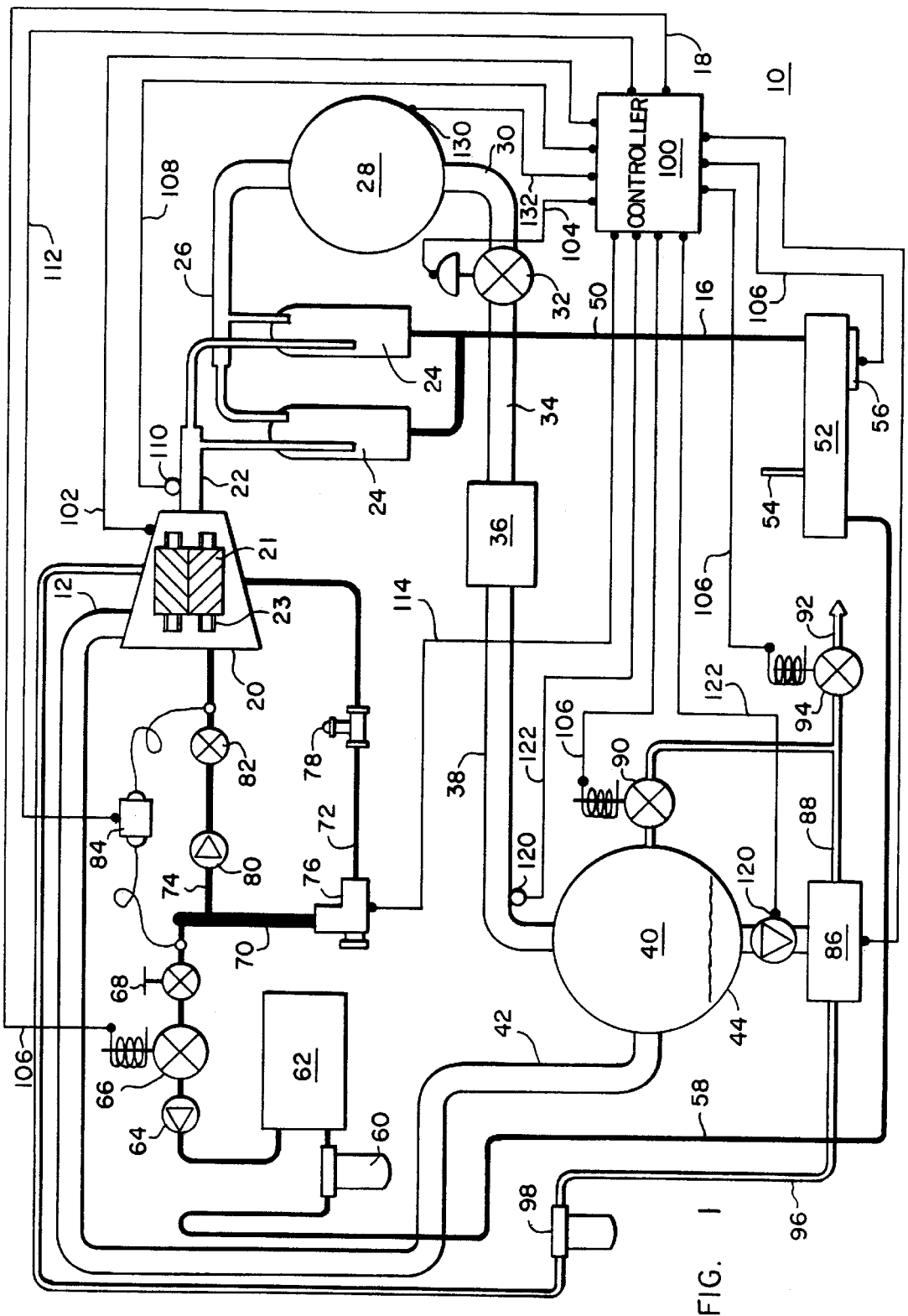
FIG. 1 is a diagram of an air conditioning or refrigeration system including a temperature conditioning subsystem, a lubrication subsystem, and a controls subsystem and which also includes the oil protection system of the present invention.

FIG. 1 shows an air conditioning or refrigeration system 10. The system 10 includes three subsystems: a temperature conditioning system 12 (illustrated by wide double lines) which conditions the temperature of a fluid, a lubrication system 16 (illustrated by narrow double lines) which lubricates the mechanical components of the conditioning system 12, and a control system 18 (illustrated by single lines) which coordinates and controls the operation of the conditioning system 12 and the lubrication system 16.

The conditioning system 12 includes a compressor 20 which compresses a refrigerant and directs the compressed refrigerant and lubricant from a compressor rotor 21 and a compressor bearing 23 through a compressor discharge 22 to one or more oil separators 24. Exemplary compressors are shown in U.S. Pat. No. 5,341,658 to Roach et al., U.S. Pat. No. 5,201,648 to Lakowske and U.S. Pat. No. 5,203,685 to Andersen et al. and exemplary oil separators are shown in U.S. Pat. No. 5,502,984 to Boehde et al. and U.S. Pat. No. 5,029,448 to Carey, all of which are commonly assigned with the present invention and all of which are incorporated herein by reference.

In the oil separators 24, the lubricant and the refrigerant are separated into a primarily lubricant mixture and a primarily refrigerant mixture. The primarily refrigerant mixture (with some entrained lubricant) is directed by conduit 26 to a condenser 28 where the refrigerant is condensed from a hot vapor to a hot liquid. The hot liquid refrigerant passes through conduit 30 to an expansion valve 32. The expansion valve 32 meters the operation of the conditioning system by controlling the flow of the hot liquid refrigerant from the condenser 28. The hot liquid refrigerant leaving the expansion valve 32 enters conduit 34 where some of the liquid refrigerant flashes into a hot vapor leaving a cooler liquid refrigerant. The mixture of vapor and liquid refrigerant enters a liquid vapor separator 36 where the hot vapor is separated out and preferably directed to the compressor 20. The cooled liquid mixture leaves the liquid vapor separator 36 by means of conduit 38 and enters an evaporator 40 where the refrigerant cools the fluid, the refrigerant vaporizing in the process. Lubricant entrained in the primarily refrigerant mixture remains and pools in the bottom 44 of the evaporator 40. A conduit 42 directs the hot vaporous refrigerant from the evaporator 40 back to the compressor 20 to continue the temperature conditioning cycle.

The lubrication system 16 includes the compressor 20 where a lubricant is injected or provided to the compressor rotor or rotors 21 and to the compressor bearing or bearings 23. The lubricant mixes with the refrigerant and the lubricant/refrigerant mixture exits through the compressor discharge 22 to the oil separator 24. The oil separator 24 separates the lubricant/refrigerant mixture into a primarily lubricant mixture and a primarily refrigerant mixture. The primarily lubricant is directed by conduit 50 to an oil sump 52. The oil sump 52 includes a vent 54 and an oil heater 56. From the oil sump 52 the primarily lubricant mixture travels through conduit 58, oil filter 60, an optional oil cooler 62, and a check valve 64 provided in the conduit 58 to prevent backflow. The conduit 58 also includes a master oil line solenoid 66 for automatic control of flow of lubricant through the conduit 58 and includes a manual service valve 68. The conduit 58 ultimately directs the primarily lubricant mixture to a large capacity, vertical line 70 which acts as a trap during compressor shutdown. The vertical line 70 feeds a rotor feed line 72 providing lubricant to the compressor rotor or rotors 21 and feeds a bearing feed line 74 providing lubricant to the compressor bearing or bearings 23. The rotor feed line 72 includes an optical oil detector 76 such as the S-9400 series level switch sold by AC&R Components of Chatham, Ill. and also includes an oil charging service port 78 for adding or removing oil lubricant. The bearing feed line 74 includes a check valve 80 and a restrictor orifice 82. A differential pressure switch 84 is provided and arranged about the restrictor orifice so as to measure a differential pressure across that orifice 82.

The lubrication system 16 also includes an oil return gas pump 86 for returning pooled lubricant from the bottom 44 of the evaporator 40. The oil return gas pump 86 returns the lubricant that accumulates from the refrigerant mixture as the refrigerant vaporizes in the evaporator 40. The accumulated lubricant passes through conduit 96 and a filter 98 and is returned to the compressor 20. Associated with the oil return gas pump is a vent line 88 whose operation is controlled by a fill solenoid 90, and a condenser pressure conduit 92 whose operation is controlled by a drain solenoid valve 94. This is more fully described in commonly assigned U.S. patent application Ser. No. 08/801,545, entitled "Oil Return from Evaporator to Compressor in a Refrigeration System", filed on Feb. 18, 1997, and incorporated herein by reference.

The control system 18 includes a controller 100 which may be implemented as a single controller or a plurality of controllers working in concert. The controller 100 is operably connected to the compressor 20 by an electrical line 102 so as to control the operation and capacity of the compressor 20. The controller 100 also controls the operation of the expansion valve by means of an electrical line 104 and controls the operation of the oil heater 56, the master oil line solenoid 66, and the solenoid valves 90 and 94 by means of an electrical lines 106. The controller 100 also includes an electrical line 108 connecting the controller 100 to a compressor discharge temperature sensor 110 located in the compressor discharge 22 so as to sense the discharge temperature of the lubricant/refrigerant mixture, and an electrical line 132 connecting the controller 100 to a saturated condenser temperature sensor 130 so as to sense the saturated condenser temperature. The controller 100 is also connected by an electrical line 112 to the differential pressure sensor 84 so as to receive a signal representative of a differential pressure from the sensor 84. The controller 100 is also connected to the optical oil detector 76 by an electrical line 114 so as to receive a signal from the optical oil detector 76 representative of the presence of oil, refrigerant or foam. The controller 100 also includes a variety of other sensors including sensors 120 associated with the evaporator and connected to the controller 100 by electrical lines 122 so as to sense the delta T across the evaporator 40 in any conventional manner.

The large capacity vertical line 70 is arranged to trap oil very near the compressor 20 at shutdown. Compressor start will not be allowed by the control system 18 until oil is detected by the oil detector sensor 76 thus guaranteeing a minimum volume of oil available at compressor start. The oil flow differential pressure sensor 84 is also checked in the off cycle to guard against a failed switch or a wiring fault.

During compressor operation, all three key components of an oil protection system are required for optimal operation. These key components are: the differential pressure sensor 84, the oil detector sensor 76, and the discharge temperature sensor 110.

The discharge temperature sensor 110 is constantly monitored and compared against the saturated condenser temperature as determined by the sensor 130. The comparison of the saturated condenser temperature with the discharge temperature determines a discharge superheat. A low superheat condition suggests that the oil separator 24 will begin to separate liquid refrigerant along with the lubricant and thus the primarily lubricant mixture will become too dilute. The controller 100 has a "time to trip" integral so that, if the superheat is deemed to be too low for too long, the system 10 will safely shutdown. The superheat value below which indefinite operation is not allowed and the total integral trip point are each determined from empirical tests on an actual system.

The differential pressure sensor 84 senses pressure across the orifice 82 and the check valve 80 in the bearing feed line 74. The differential pressure sensor 84 is calibrated for a switch point relating to a desired minimum oil flow rate and the sensor 84 basically indicates the presence or absence of that minimum oil flow rate. The orifice 82 serves to provide pressure drop to indicate actual flow, while balancing oil flow to the bearing 23 as compared to the oil flow to the rotor 21. Since previous compressors 20 had orifices located within the compressor, the removal of the orifice 82 outside the compressor 20 improves oil quality by extending the dwell time that the oil is at a lower pressure to thereby release more refrigerant to vapor before the lubricant enters the compressor 20 to lubricate the bearings 23. The longer dwell time helps vaporize any liquid refrigerant still entrained in the lubricant to ensure that a liquid comprising highly concentrated lubricant is used to lubricate the compressor 20. The pressure sensor 84 is constantly monitored in normal operation and will shutdown the system 10 if flow is lost for more than a predetermined time period such as two seconds.

The oil detector sensor 76 was previously used only as a binary level switch but is used in the present invention additionally as an analog sensor for foam quality. This is described as follows.

Under most normal operating conditions, the oil flow in the rotor feed line 72 has only a small amount of vapor and the flow is generally clear with only a small amount of bubbles or foaming present. In certain operating conditions foaming in the line 72 is normal and must be differentiated from the very dry foam condition which occurs as oil is lost from the primary lubrication system 16 and the level of oil in the oil sump 52 falls.

Figure 2:
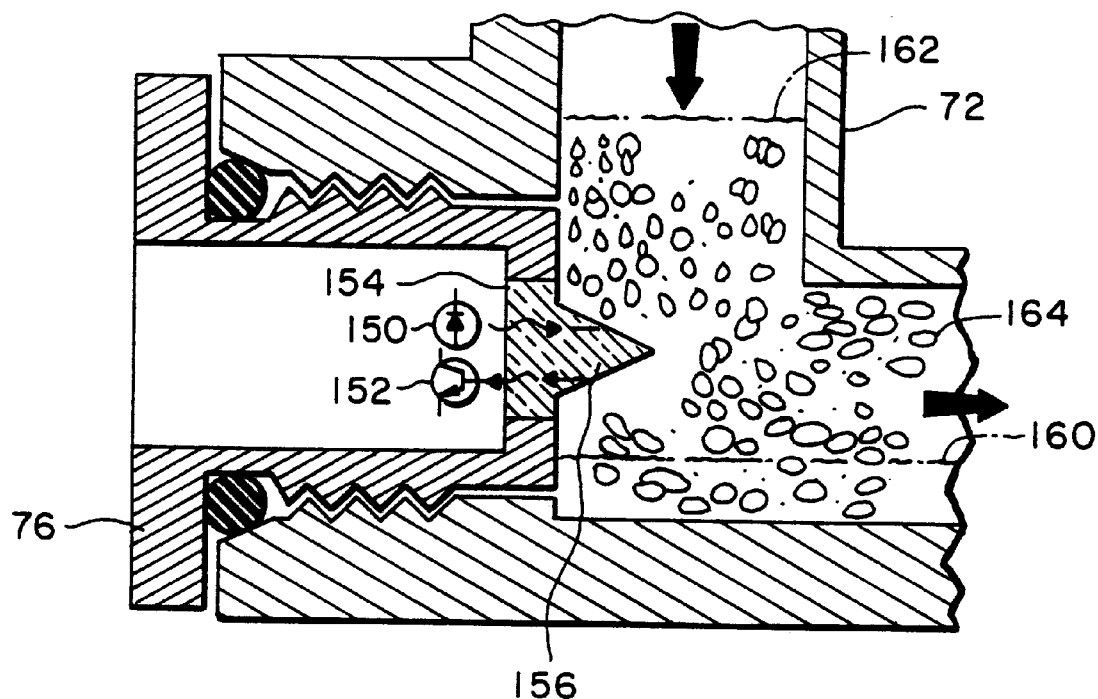
FIG. 2 is a cutaway diagram of a liquid level sensor in accordance with the present invention.

Referring to FIG. 2, the sensor 76 uses an infrared LED 150 and a matching infrared detector 152 in conjunction with a conical glass prism 154 having an interface 156 exposed to the rotor feed line 72. Owing to the properties associated with the index of refraction of light as light passes through a glass to vapor interface as opposed to a glass to liquid interface, the light from the LED 150 is either reflected back to the detector 152 when vapor is present within the rotor feed line 72 or is only marginally reflected when oil is present within the rotor feed line 72. The detector 152 then controls an open collector transistor for a discrete binary output. The off state (or high output) implies dry as illustrated by a liquid level at line 160, while the on state (or low output) implies wet as illustrated by a liquid level at line 162. This concept has previously been patented by others as evidenced by U.S. Pat. No. 5,278,426 to Barbier, the disclosure of which is hereby incorporated by reference. In these previous uses, the sensor was used solely at start-up when the liquid level had already stabilized so the liquid level could be sensed relative to the interface 156 such as shown by the liquid level lines 160 and 162. However, once the compressor 20 commences operation, the interior of the large capacity vertical line 70 and the rotor feed line 72 represents a dynamic mix of liquid lubricant and refrigerant as well as vaporous refrigerant resulting in a foamy mix indicated by the bubbles 164. Conventionally, the sensor 76 can no longer be used because there is no stable liquid level to sense. The present invention enables the conventional sensor to be used in a dynamic environment to sense the quality of the foam, enabling the verification that enough lubricant is present in the foam to ensure proper compressor operation.

With minor modifications to the internal components of the sensor 76 to control the sensitivity of the detector 152 and a calibration process to adjust the LED light output from the LED 150, the sensor 76 is used for foam determination. The internal components of the sensor 76 are selected so that the detector 152 has a gain lying within a desired range. The desired gain and the desired range are empirically determined based on the environment to be sensed and will vary with any particular lubricant and refrigerant combination. Only detectors 152 which meet the desired gain and range criteria are used in the sensor 76. The intensity of the LED 150 is then calibrated to get the correct output for the desired criteria. This calibrated intensity will vary with the environment being sensed specifically including the lubricant and the refrigerant combinations being sensed.

When such a calibrated sensor 76 is used in the oil protection system of the present invention, the calibrated sensor 76 creates a very "noisy" signal due to the random nature of foamy flow, reacting very quickly to the small vapor bubbles 164 moving over the prism 154 and reflecting light back to the detector 152. As the vapor content of the foam 158 in the rotor feed line 72 increases, so does the DC level of the signal from the sensor 76.

Figure 3:
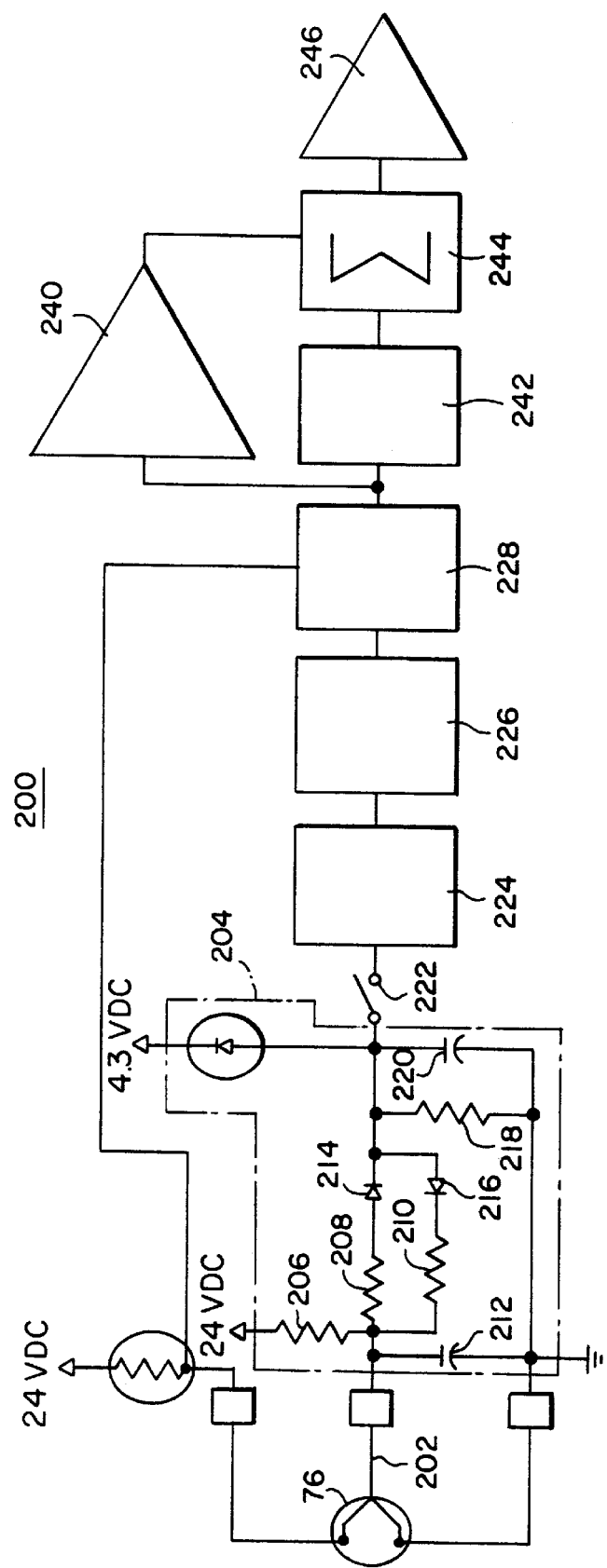
FIG. 3 depicts a block diagram for processing a signal from the liquid level sensor of FIG. 2.

FIG. 3 depicts a block diagram 200 for processing the signal from the sensor 76 in the controller 100. This signal is processed by the controller 100 using special filtering to create an analog value representative of the foam content. A time to trip function is implemented in the software in the controller 100 to define a foam content level beyond which a time integral is begun and the ultimate trip value for the integral at which compressor operation is terminated. The values for the protection level were empirically determined.

The signal from the sensor 76 is provided on an electrical line 202 and passes through a first order filter and voltage divider 204 which roughly filters the signal and converts the 24 VDC signal to a 5 VDC signal. As depicted in FIG. 3, the filter and voltage divider 204 includes a pull-up resistor 206, a 200 k ohm resistor 208, a 30.1 k ohm resistor 210, a 0.1 microfarad capacitor 212, diodes 214 and 216, a 100 k ohm resistor 218 and a 15 microfarad capacitor 220. Of course, these values are dependent upon the application and will vary accordingly.

After leaving the filter and voltage divider 204, the signal is sampled at a rate of 200 milliseconds by a sampler 222 and then the signal is converted to a 10 bit digital signal by the analog to digital converter 224. The resultant digital signal enters a infinite impulse response filter 226 having a time constant of 6.4 seconds. This filter 226 smoothes out the resultant digital signal by taking a running historical sample of the last 32 samples and averaging them according to the following formula:

Filtered signal=$\frac{1}{32}$ of the latest signal+$\frac{31}{32}$ of the old average.

The filtered signal from the filter 226 is provided to a 24 volt compensator 228 which compensates for variations in the sensor supply voltage to avoid errors resulting from variations in the 24 VDC supply voltage, these errors typically ranging between 19 and 26 VDC.

The compensated signal is passed to an integrator control 240, an offset and time scaling block 242 and an integrator 244. In the preferred embodiment, time scaling is unnecessary since the integration rate is the same as the sampling rate of 200 milliseconds used by the sampler 22. Otherwise, the data of one rate must be adjusted, prorated or synchronized to equate to the data sampled at the other rate.

The offset portion of the block 242 is used to establish a desired level of lubricant quality. Of course, multiple such levels may be established, or the accumulated integral may be used as a conventional analog signal.

The integrated control 240 specifies a must integrate level of 778 bit counts, this level being an empirically determined offset level differentiating dry foam from lubricant laden foam and corresponding to 3.8 VDC. The integrate level 778 is empirically selected to avoid transient levels which might occur at start-up as well as any other transient fluctuations in the line level. Integration is enabled above this level and the integrator 244 will continue to integrate the product of bit count times time while the bit count remains above 778. The integration of new bit counts will terminate between 573 and 778 bit counts but the already integrated amount will be held unless the bit count level in the compensated signal drops below 573, this bit count being the equivalent of 2.8 VDC. When the bit count measure drops below 573 bit counts, the accumulated integral in the integrator 244 will be cleared. Between 573 and 778 bit counts, the accumulated integral will be held but no new integral values will be added. Only above 778 bit counts will the integrator control 240 allow the accumulation of bit counts.

The summed integral will be provided as an analog signal to a comparitor 246 which trips whenever the integrated bit count exceeds 3,200 bit count seconds. This trip count is empirically determined and will vary for any particular system or application. Protective action will be called for when the trip count is exceeded.

Essentially, the foam causes a high number of transitions between the high and low states, and the high number of transitions caused by such foam is treated as "chatter" and measured to determine an analog signal representative of the state of the fluid in the conduit 72.

Thus, a binary sensor 76 provides an analog output representative of the quality of the bubbles 164. As discussed above, the new use applies to dynamic operation as opposed to start-up or static operation.

What has been described is a binary sensor which is used in a new way to provide an analog signal rather than a digital signal. A person of ordinary skill in the art will recognize that many modifications of the sensor will be apparent including the application of the invention to various other applications particularly those having both static and dynamic requirements to monitor liquid and vaporous fluids. Additionally, the invention can be generalized with regard to the liquid level sensor to apply to other environments where the presence of a certain quality of foam in a conduit is desired to be measured. Other modifications and alterations are also evident specifically contemplating modifications and alterations to the implementing circuitry of FIG. 3 and the sensor selected and shown in FIG. 2. All such modifications and alterations are contemplated to fall within the spirit and scope of the attached claims.

What is desired to be secured as Letters Patent of the United States is as follows.

What is claimed is:

1. A control arrangement using a sensor having a binary output to monitor a fluid having three states, the arrangement comprising:

a prime mover;

a controller operable to control the prime mover;

a sensor measuring the presence or absence of a fluid and providing a binary signal to the controller;

the controller being responsive to the binary signal indicating the presence or absence of the fluid and the controller determining an analog signal by monitoring the rate of binary transitions in the binary signal;

wherein the prime mover has an inactive state and an active state, and wherein the controller is responsive to the binary signal in the inactive state and is responsive to the analog signal in the active state.

2. A control arrangement using a sensor having a binary output to monitor a fluid having three states, the arrangement comprising:

a prime mover;

a controller operable to control the prime mover;

a sensor measuring the presence or absence of a fluid and providing a binary signal to the controller;

the controller being responsive to the binary signal indicating the presence or absence of the fluid and the controller determining an analog signal by monitoring the rate of binary transitions in the binary signal;

wherein the sensor is a liquid level sensor monitoring the presence or absence of a liquid and providing a binary signal indicative of the presence or absence of the liquid; and the controller is operably connected to the sensor and receiving the binary signal, the controller including components to sample the rate of transitions of the binary signal between a presence indicating signal and an absence indicating signal and components to convert the sampled signal to an analog signal.

3. A control arrangement using a sensor having a binary output to monitor a fluid having three states, the arrangement comprising:

a prime mover;

a controller operable to control the prime mover;

a sensor measuring the presence or absence of a fluid and providing a binary signal to the controller;

the controller being responsive to the binary signal indicating the presence or absence of the fluid and the controller determining an analog signal by monitoring the rate of binary transitions in the binary signal;

the controller further including components to integrate the analog signal and to issue control signals responsive to that integrated accumulation.

4. A method of using a sensor comprising the steps of:

sensing a condition;

transmitting a binary signal having either a first state or a second state indicative of the sensed condition;

determining either a first or a second mode of operation of a prime mover to be in effect;

operating the prime mover, in the first mode of operation, responsive to the first or second state of the binary signal; and operating the prime mover, in the second mode of operation, responsive to the rate of transition of the binary signal between the first and second states.

5. The method of claim 4 wherein the condition sensing step includes the further steps of sensing a liquid level of a static environment in the first mode of operation and sensing turbulence or chatter of a dynamic environment in the second mode of operation.

6. The method of claim 5 wherein the step of operating the prime mover in the second mode of operation includes the further steps of sampling the rate of transition between first and second states, converting the rate to a bit count level, and integrating the bit count level over time.

7. The method of claim 6 including the further step of continuously transmitting the accumulated integral as an analog signal.

8. The method of claim 4 including the further step of sampling the rate of transition to the binary signal between the first and second state and converting the sample signal to an analog signal.

9. A method of monitoring a fluid having three states, the method comprising the steps of:

controlling the operation of a prime mover;

measuring the presence or absence of a fluid;

providing a binary signal indicative of the presence or absence of the fluid;

receiving the binary signal;

monitoring a rate of binary transitions in the binary signal; and determining, from the monitored binary transitions, an analog signal representative of a quality of the fluid.

10. The method of claim 9 wherein the monitoring step includes the further step of sampling the rate of transitions of the binary signal between a presence indicating signal and an absence indicating signal; and wherein the providing step indicates in the binary signal the presence or absence of the fluid.

11. The method of claim 10 including the further step of converting, responsive to the sampled rate of transitions, the binary signal to an analog signal.

12. The method of claim 11 including the further steps of integrating the analog signal and issuing control signals responsive to an integrated accumulation.

13. The method of claim 12 where the binary signal has a first state and a second state, and including the further steps of operating a prime mover in a first mode of operation responsive to the first or second state of the binary signal.

14. The method of claim 13 including the further step of operating the prime mover in a second mode of operation responsive to the rate of transition of the binary signal between the first and second states.

15. The method of claim 13 including the further steps of converting the rate of transition between the first and second states to a byte count level and integrating the byte count level over time.

16. A control arrangement using a sensor having a binary output to monitor a fluid having three states, the arrangement comprising:

a prime mover;

a controller operable to control the prime mover;

a sensor measuring the presence or absence of a fluid and providing a binary signal to the controller;

the controller being responsive to the binary signal indicating the presence or absence of the fluid and the controller determining an analog signal by monitoring the rate of binary transitions in the binary signal;

wherein the control samples the rate of transition between the binary transitions in the binary signal, converts the rate to a byte count level and integrates the byte count level over time and continuously transmits the accumulated integral as an analog signal.

* * * * *